US010877976B2

(12) United States Patent
Miao et al.

(10) Patent No.: US 10,877,976 B2
(45) Date of Patent: Dec. 29, 2020

(54) RECOMMENDATIONS FOR ONLINE SYSTEM GROUPS

(71) Applicant: Facebook, Inc., Menlo Park, CA (US)

(72) Inventors: Yi Miao, Redmond, WA (US); Kelly Jayne Mayes, San Francisco, CA (US); Eric Carl Ertmann, San Francisco, CA (US); Li Ju, Issaquah, WA (US); Congle Zhang, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 647 days.

(21) Appl. No.: 15/585,628

(22) Filed: May 3, 2017

(65) Prior Publication Data

US 2018/0322122 A1   Nov. 8, 2018

(51) Int. Cl.

| | |
|---|---|
| *G06Q 30/06* | (2012.01) |
| *G06F 16/2457* | (2019.01) |
| *G06F 16/28* | (2019.01) |
| *G06F 16/9535* | (2019.01) |
| *G06N 20/00* | (2019.01) |
| *G06Q 50/00* | (2012.01) |
| *G06N 5/04* | (2006.01) |
| *H04L 29/08* | (2006.01) |

(52) U.S. Cl.
CPC ...... *G06F 16/24578* (2019.01); *G06F 16/287* (2019.01); *G06F 16/9535* (2019.01); *G06N 5/046* (2013.01); *G06N 20/00* (2019.01); *G06Q 30/0631* (2013.01); *G06Q 50/01* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 8,539,086 B2 * | 9/2013 | Mallet | G06Q 50/01 709/227 |
| 9,049,259 B2 * | 6/2015 | Rathod | H04N 21/44222 |
| 9,276,973 B2 * | 3/2016 | Lyren | H04L 65/403 |
| 10,726,456 B2 * | 7/2020 | Denton | G06Q 30/0605 |
| 2012/0109749 A1 * | 5/2012 | Subramanian | G06Q 30/0255 705/14.53 |

* cited by examiner

*Primary Examiner* — Tuankhanh D Phan
(74) *Attorney, Agent, or Firm* — Fenwick & West LLP

(57) ABSTRACT

An online system provides group recommendations by applying a set of sourcing rules to identify a plurality of candidate groups and then generating scores for the candidate groups. The sourcing rules can be configured to identify a relatively small subset of the groups maintained by the online system. After the candidate groups are identified, the online system generates a score for each candidate group, ranks the candidate groups based on the scores, and sends high-ranking candidate groups to the target user to be displayed as recommended groups. As a result, the online system generates a smaller number of scores, which advantageously allows for the online system to provide group recommendations to users in a more computationally efficient manner.

20 Claims, 5 Drawing Sheets

RECOMMENDATIONS FOR ONLINE SYSTEM GROUPS

BACKGROUND

This invention relates generally to online systems and more specifically to recommending groups of users to a user of an online system.

An online system, such as a social networking system, allows its users to connect to and communicate with other online system users. Users may create profiles on an online system that are tied to their identities and include information about the users, such as interests and demographic information. The users may be individuals or entities such as corporations or charities.

Additionally, an online system may maintain groups of users, allowing a user to provide content to a group for presentation to other users who are members of the group. A group may be associated with a topic, a location, or with any other suitable characteristic, so a user included in the group may more easily view or share content associated with the characteristic associated with the group. Because an online system may maintain a large number of groups, a user may spend significant time looking for groups that the user finds interesting. This decreases the likelihood of the user identifying groups of interest to the user, which may decrease the amount of interaction between the user and the online system.

SUMMARY

An online system provides a plurality of recommended groups to a user. The online system identifies a target user who will receive the group recommendations. One or more sets of sourcing rules are applied to the groups maintained by the online system. The sourcing rules identify a plurality of candidate groups from the broader set of groups on the online system. After identifying the candidate groups, the online system generates scores that represent the likelihood that the target user will join each candidate group if presented with a recommendation to join the group. The online system uses the scores to select one or more groups to present to the target user and sends the target user a recommendation to join the selected groups.

Figure 1:
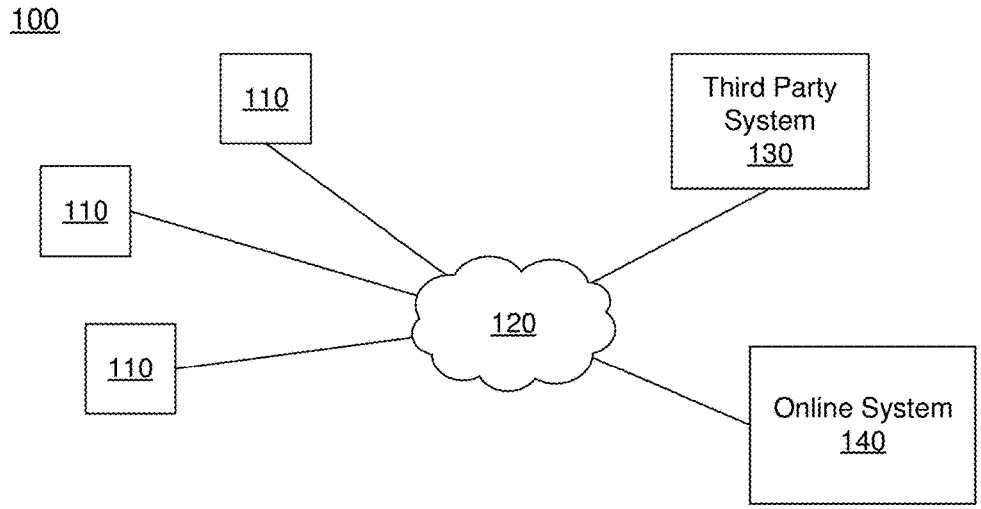
FIG. 1 is a block diagram of a system environment in which an online system operates, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online system maintains groups of users. Each group may provide a page that allows its members to communicate with other members of the group. For example, a group may allow members to post content items such as text-based messages, photos, documents, events, and links viewable by all or a subset of the group members. A group may have one or more characteristics, such as one or more topics associated with the group and a location associated with the group. For example, a group titled "Bay Area Michigan Football Fans" may be associated with the topics "Sports," "College Football," and "Michigan Wolverines," and may further be associated with the San Francisco Bay Area.

To increase user engagement with the online system in general and with groups in particular, the online system may provide a feature that generates group recommendations for users. One way to implement a group recommendation feature is for the online system to generate a score between a target user and each group maintained by the online system, where the score represents the likelihood that the target user will join the group if presented with a recommendation to join the group. The online system can then display recommendations for the groups that received the highest scores.

This method of providing group recommendations is infeasible for online systems with large numbers of groups and users. For example, a popular online system may have tens or hundreds of millions of groups, and generating a score for every group require an impractical amount of computing power, especially when the process is repeated for many users of the online system.

Instead of generating a score for each group, an online system provides group recommendations in a more computationally efficient manner by applying a set of sourcing rules to identify a plurality of candidate groups and then generating scores for the candidate groups. The sourcing rules can be configured to identify a relatively small subset of the groups maintained by the online system. For example, the sourcing rules can be configured to identify a few hundred groups (out of the millions of groups maintained by the online system) as candidate groups. After the candidate groups are identified, the online system generates a score for each candidate group, ranks the candidate groups based on the scores, and sends high-ranking candidate groups to the target user to be displayed as recommended groups. As a result, the online system generates a smaller number of scores, which advantageously allows for the online system to provide group recommendations to users in a more computationally efficient manner.

In one embodiment, the online system applies a single set of sourcing rules to the groups maintained by the online system. In another embodiment, the online system applies several different sets of sourcing rules, and each set of sourcing rule is used to identify a category of candidate groups. Categories may be based on topic (e.g., categories for candidate groups about music, sports, books, or food), or they may be based on other characteristics (e.g., categories for candidate groups whose members are friends with the target user, candidate groups associated with a location close to the target user, or candidate groups associated with a trending topic).

System Architecture

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
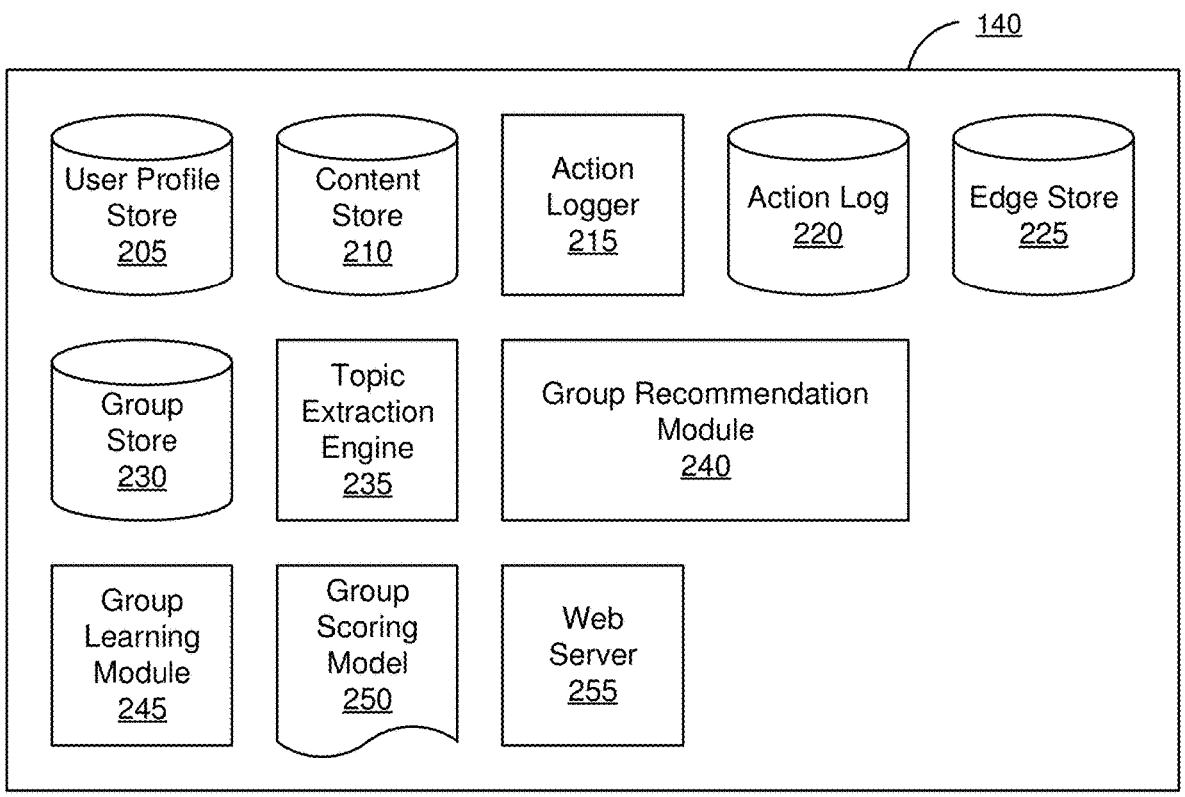
FIG. 2 is a block diagram of an online system, according to an embodiment of the invention.

FIG. 2 is an example block diagram of an architecture of the online system 140. The online system 140 shown in FIG. 2 includes a user profile store 205, a content store 210, an action logger 215, an action log 220, an edge store 225, a group store 230, a topic extraction engine 235, a group recommendation module 240, a group learning module 245, a group scoring model 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Users and objects within the online system can represented as nodes in a social graph that are connected by edges stored in the edge store.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 stores objects that each represents a group on the online system 140. Groups include one or more users and can have one or more characteristics. Characteristics can include, for example, one or more topics associated with the group (e.g., as determined by the topic extraction engine 235, by user input from a group administrator, or by user input from a plurality of users through a crowd-sourcing process), a location associated with the group, and one or more companies, educational institutions, charities, or other organizations. Users included in a group are referred to as "members" of the group or "group members." A user becomes included in a group after the user joins the group, and a single user can join a plurality of groups. The plurality of groups that a particular user has joined is referred to as "the user's groups," "the user's associated groups," or "groups connected to the user." Groups can be "open," allowing anyone to join, or "closed," requiring a user to request to join or be invited by an existing group member to join. Thus, a user is unable to join a "closed" group until addition of the user to the group is approved (e.g., by a group manager), or until the user provides credentials (such as an email address from a particular domain, a password, or the like).

A group may have a dedicated page on the online system serving as an information hub that allows group members to communicate with each other. For example, a group page includes a wall that allows group members to post content items such as text-based messages, photos, documents, events, and links viewable by all or a subset of the group members. A content item posted to the group may then be added to the content store 210, and an edge connecting the content item to the group may be created in the edge store 225. Alternatively, if a group member posts a content item that has already been added to the content store 210, the posting of the content item in the group creates an edge connecting the existing content item to the group without adding the content item to the content store 210 a second time. The group page may further allow group members to access other group features or information, such as a group calendar or other group members. In some instances, all or part of the information accessible via the group page is visible only to members of the group.

The online system 140 may allow any user to create a group. In one embodiment, a user provides information for creating a group using a specified form. Online system users may add other users to a group. Users may opt out of a group to which they are added, or users may require that they approve of any group to which they are added by other users prior to being added to the group. In one embodiment, if a user opts out of a group, the online system prevents other users from re-adding the user to the group without preapproval from the user.

Similar to other objects, groups are represented in the social graph by a node. A node representing a user that is a member of the group is connected to the node representing the group by an edge representing the association of the user with the group. Additional edges between a node representing a user and a node representing a group may be established to identify interactions between the user and the group. For example, the node associated with a user is connected to the node representing a group by an edge representing a communication to the group from the group members, and any number of additional edges representing other interactions between the group member and the group may be added. The group node may also be connected to a node representing the group's subject matter.

The topic extraction engine 235 identifies one or more topics associated with objects in the content store 210 or with groups in the group store 230. To identify topics associated with content items, the topic extraction engine 235 identifies anchor terms included in a content item and determines a meaning of the anchor terms as further described in U.S. patent application Ser. No. 13/167,701, filed Jun. 24, 2011, which is hereby incorporated by reference in its entirety. For example, the topic extraction engine 235 determines one or more topics associated with a content item maintained in the content store 210. The one or more topics associated with a content item are stored and associated with an object identifier corresponding to the content item. In various embodiments, associations between object identifiers and topics are stored in the topic extraction engine 235 or in the content store 210 to simplify retrieval of one or more topics associated with an object identifier or retrieval of object identifiers associated with a specified topic. Structured information associated with a content item may also be used to extract a topic associated with the content item.

To identify topics associated with a group, the topic extraction engine 235 identifies content items associated with the group based on information included in the group store 230 and determines topics associated with content items associated with the group based on anchor terms included in the content items as described above. In one embodiment, the topic extraction engine 235 associates a topic with a group if the topic is associated with at least a threshold number or threshold percentage of content items associated with the group. Alternatively, the topic extraction engine 235 ranks topics based on a frequency with which the topics are associated with content items associated with a group and associates topics having at least a threshold position in the ranking with the group.

To identify topics associated with a group, the topic extraction engine 235 may additionally or alternatively identify anchor terms included in the group itself (e.g., in the title or description of the group), determine a meaning of the anchor terms, and identify one or more topics associated with the meaning of the anchor terms. Topics associated with a group may be stored in the group store 230 as part of the object representing the group, or in association with an identifier for the group.

The group recommendation module 240 uses a process involving sourcing rules to recommend groups to a target user on the online system. The sourcing rules allow the group recommendation module 240 to identify a plurality of candidate groups in the group store 230. For example, sourcing rules may identify a group as a candidate group if: members of the group are also connected to the target user (e.g., members are "friends" of the target user); the group is associated with a location close to the target user's location; the group is especially active or popular; the group is associated with a trending topic; or the target user has an attribute that a large percentage of the group's members also have.

The group recommendation module 240 computes a score for each of the candidate groups and ranks the candidate groups according to the scores. For example, the group recommendation module 240 computes the score for a candidate group by extracting features from the candidate group and providing the features as input to the group scoring model 250, which is described in further detail below. The group recommendation module 240 may also modify the ranking based on one or more diversification rules, which prevent candidate groups having a common characteristic from appearing in consecutive positions in the ranking. The group recommendation module 240 selects some of the candidate groups to display to the target user as recommended groups based on the ranking. After selecting the groups, the group recommendation module 240 sends the groups to be displayed to the target user with a recommendation to join the groups.

The group learning module 245 applies machine learning techniques to generate a group scoring model 250 that, when applied to a candidate group, outputs a score representing a likelihood that the target user will join the candidate group if presented with a recommendation to join the candidate group. As part of the generation of the group scoring model 250, the group learning module 245 forms a training set of groups by identifying a positive training set of groups that the target user chose to join after being presented with a recommendation to join the group, and, in some embodiments, forms a negative training set of groups that the target user declined to join after being presented with a recommendation to join the group.

The group learning module 245 extracts feature values from the groups of the training set, the features being variables deemed potentially relevant to the likelihood that the target user will join the group if presented with a recommendation to join the group. Specifically, the feature values extracted by the group learning module 245 may include values representing: the number of interactions the target user carried out with groups having at least a threshold number of characteristics matching or similar to the candidate group (hereinafter referred to as "similar groups"); the number of interactions the target user carried out with content items associated with similar groups; and the number of interactions the target user carried out with content items having at least a threshold number of characteristics matching or similar to the candidate group (hereinafter referred to as "similar content items"). In some embodiments, the group learning module 245 extracts separate feature values representing different types of interactions. For example, the group learning module 245 extracts separate feature values representing the number of times the target user provided a content item to a similar group, the number of times the target user added a content to a content item associated with a similar group, the number of times the target user shared a content item associated with a similar group, the number of times the target user indicated a preference ("liked" or "reacted to") a content item associated with a similar group, and the number of times the target user viewed a content item association with a similar group for at least a threshold length of time. Similar feature values may additionally or alternatively be extracted for the number of times the target user carries out these actions toward a similar content item.

An ordered list of the features for a content item is herein referred to as the feature vector for the group. In one embodiment, the group learning module 245 applies dimensionality reduction (e.g., via linear discriminant analysis, LDA); principle component analysis, PCA; or the like) to reduce the amount of data in the feature vectors for group to a smaller, more representative set of data.

The group learning module 245 uses supervised machine learning to train the group scoring model 250, with the feature vectors of the positive training set and, in some embodiments, the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The group scoring model 250, when applied to the feature vector extracted from a group, outputs an indication of whether the content item has the property in question, such as a Boolean yes/no estimate, or a scalar value representing a probability.

In some embodiments, a validation set is formed of additional groups, other than those in the training sets, which have already been recommended to the target user and either joined or not joined by the target user. The group learning module 245 applies the trained validation group scoring model 250 to the groups of the validation set to quantify the accuracy of the group scoring model 250. Common metrics applied in accuracy measurement include: Precision=TP/(TP+FP) and Recall=TP/(TP+FN), where TP is the number of true positives, FP is the number of false positives, and FN is the number of false negatives. Precision is the number of groups in the validation set that the group scoring model 250 correctly predicted out of the total it predicted and recall is the number of groups in the validation set that the group scoring model 250 correctly predicted out of the total number of groups that the target user joined after a recommendation to join the group was displayed to the target user. A third metric is the F-score: F-score=2*(precision*recall)/(precision+recall). The F-score unifies precision and recall into a single measure. In one embodiment, the group learning module 245 iteratively re-trains the group scoring model 250 until the occurrence of a stopping condition, such as the accuracy measurement indication that the model is sufficiently accurate (e.g., the precision, recall, or F-score exceed respective threshold values), or a number of training rounds having taken place.

The web server 255 links the online system 140 via the network 120 to the one or more client devices 110, as well as to the one or more third party systems 130. The web server 140 serves web pages, as well as other web-related content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or RIM®.

Recommending Groups to a User

Figure 3:
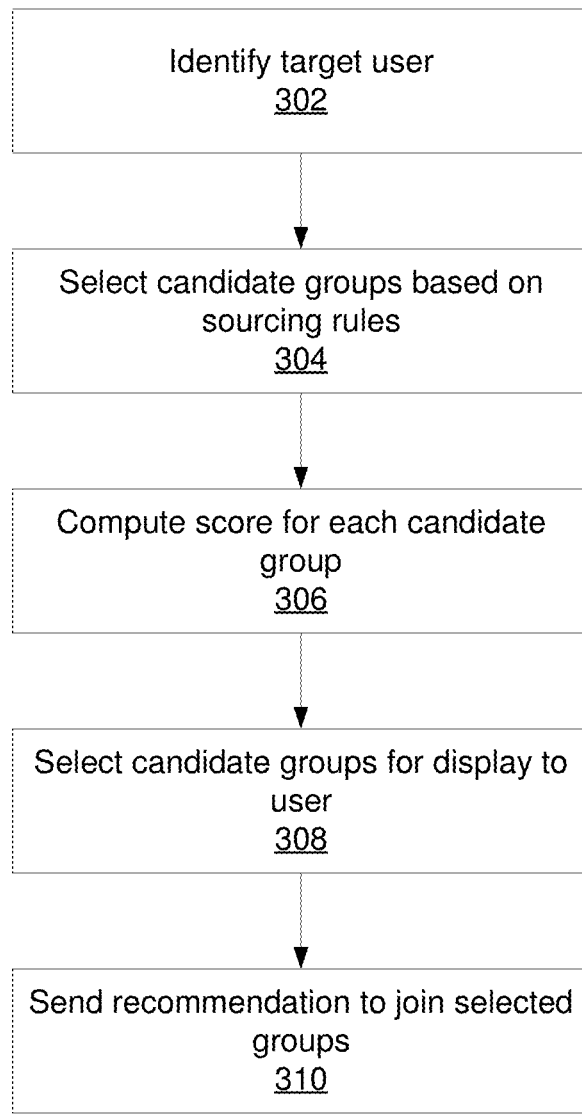
FIG. 3 is a flow chart illustrating a method for recommending groups to a user of an online system, according to an embodiment of the invention.
Figure 4:
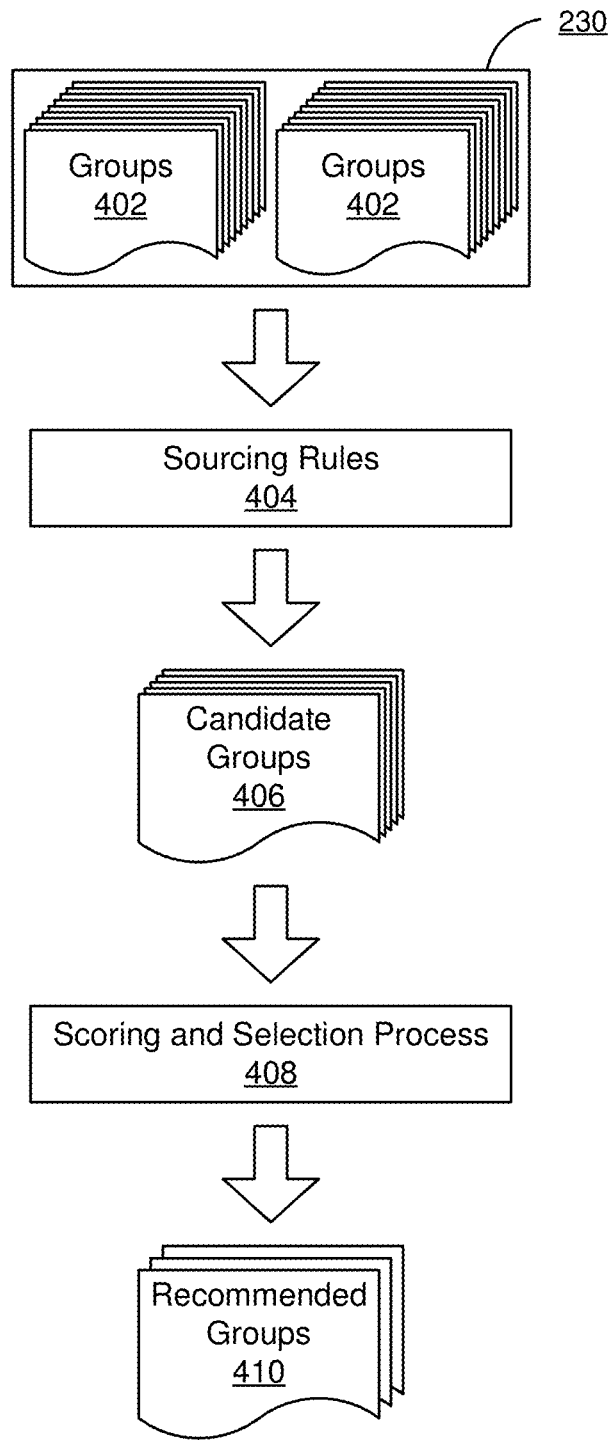
FIG. 4 is a data flow diagram illustrating an example of using a set of sourcing rules and a selection process to recommend groups to a user of an online system, according to an embodiment of the invention.

FIG. 3 is a flow chart illustrating a method for recommending groups to a user of an online system, according to an embodiment of the invention. FIG. 4 is a data flow diagram illustrating an example of using a set of sourcing rules and a selection process to recommend groups to a user of an online system, according to an embodiment of the invention. For ease of description, the method shown in FIG. 3 will be described in conjunction with the diagram shown in FIG. 4.

The group recommendation module 240 identifies 302 a target user who will receive the group recommendations that are generated by the method. Identifying 302 the target user allows the method to generate group recommendations that are personalized to the target user. Although the method is described herein with respect to a single target user, the method can be repeated to generate group recommendations for a plurality of target users of the online system 140. For instance, the method can operate periodically for some or all users of the online system 140 to maintain an up-to-date set of group recommendations for those users. Alternatively, the method can operate when a user accesses a group discovery interface provided by the online system 140.

The group recommendation module 140 applies a set of sourcing rules to select 304 a plurality of candidate groups from the group store 230. As referred to herein, a sourcing rule specifies one or more criteria that can be used to identify a plurality of groups in the group store 230. FIG. 4 illustrates an example of applying a set of sourcing rules to select 304 a plurality of candidate groups from the group store 230. As shown in FIG. 4, the sourcing rules 404 can identify as candidate groups 406 a relatively small subset of the groups 402 in the group store 230. For example, the group store 230 of an online system 140 may contain several million groups, while the sourcing rules 404 identify a few hundred candidate groups 406.

The group recommendation module 240 can implement several different types of sourcing rules, and the set of sourcing rules 404 that the group recommendation module 240 applies to identify the plurality of candidate groups 406 can include any combination of one or more types of sourcing rules.

A first type of sourcing rule identifies a group as a candidate group if the number of members in the group who are connected to the target user (e.g., "friends" of the target user) exceeds a threshold number of members. The threshold number of members can be a fixed number (e.g., one member, two members, five members, etc.) or a percentage of the total number of members of the group (1%, 2%, 5%, etc.). In one embodiment, the first type of sourcing rule includes instructions to access the edge store 225 to identify the users connected to the target user (e.g., the target user's "friends") and to access the edge store 225 again to find the groups that the connected users have joined. If the sourcing rule is implemented with a threshold of one member (e.g., the sourcing rule identifies a group as a candidate group as long as one member of the group is connected to the target user), then each group found at this stage is identified as a candidate group. If the sourcing rule is implemented with a different threshold, then the sourcing rule further includes instructions to compute the total number of connected users in each group that was found and to compare the total number of total number of connected users in each group to the threshold.

A second type of sourcing rule identifies a group as a candidate group if the group is associated with a location (hereinafter referred to as "the group's location") close to a location associated with the target user (hereinafter referred to as "the target user's location"). The group's location can be provided by as user input by a group administrator or a group member. The group's location can additionally or alternatively be inferred from information associated with the group. For example, the group's location can be inferred from locations associated with the group's members or locations associated with content items posted in the group. The target user's location can be the current location of the target user, such as the location reported by the target user by "checking in" to a particular place or the location reported by a location module (e.g., a GPS receiver) on the target user's client device (in some embodiments, the location data from the location module is provided to the online system 140 only if the user has configured his or her privacy settings to allow the data to be provided). The target user's location can also be a location corresponding to the target user's home or workplace (e.g., provided by the target user or inferred from information associated with the user, if allowed by the target user's privacy settings).

The group's location can be deemed to be "close to" the target user's location in a variety of ways. In one embodiment, each of the two locations is a geographic area, such as a city, town, or county, and a group's location is close to the target user's location if the two geographic areas are the same, if the two geographic areas overlap by a threshold amount, if the length of the shared border between the two geographic areas exceeds a threshold length, or if the distance between the two geographic areas is less than a threshold distance. In another embodiment, each of the two locations is a point (e.g., a set of latitude and longitude coordinates), and a group's location is close to the target user's location if the distance between the two locations is less than a threshold distance. In still another embodiment, one of the locations is a point (e.g., the target user's current latitude-longitude coordinates) and the other location is geographic area (e.g., the group is associated with a city), and the two locations are close to each other if the point is inside the geographic area or if the distance between the point and the nearest edge of the geographic area (or the center of the geographic area, or some other point representing the geographic area) is less than a threshold distance.

A third type of sourcing rule identifies a group as a candidate group if the group is especially active or popular. The level of activity in a group can be quantified by computing an activity score based on the number of actions associated with the group that were taken in a preceding time period (e.g., the preceding 24 hours, the preceding 7 days). Actions associated with the group can include, for example, the posting of a content item to the group and an action taken toward a content item posted to the group (e.g., adding a comment to the content item, expressing a preference for the content item, or sharing the content item).

In one embodiment, the sourcing rule operates by identifying a plurality of groups close to the target user (using one or more of the methods described above with reference to the second type of sourcing rule) and generating an activity score for each of the plurality of groups. The sourcing rule identifies a group as a candidate group if the activity score for the group exceeds a threshold score. The threshold score can be a fixed value or it can be generated based on the number of members in the group or some other metric for the group. Alternatively, the sourcing rule ranks the groups by activity score and identifies a group as a candidate group if the group has a ranking above a threshold ranking.

A fourth type of sourcing rule identifies a group as a candidate group if the group is associated with a trending topic. In one embodiment, the online system 140 maintains a list of trending topics (e.g., the topics that were subject to the most activity during a preceding time window), and the sourcing rule identifies a group as a candidate group if the group has been classified (e.g., by the topic extraction engine 235) as being associated with one of the trending topics. For example, in the days preceding the Super Bowl, the two football teams that will be playing in the Super Bowl may become trending topics, and the sourcing rule may identify groups associated with the two teams as candidate groups.

A fifth type of sourcing rule identifies a group as a candidate group if many of group's members have an attribute that the target user also has. Examples of attributes include place of employment, membership in an organization, or current and/or past attendance at an educational institution. In one embodiment, the sourcing rule identifies a group as a candidate group if the target user has a particular attribute and the percentage of the group's members that also have that particular attribute exceeds a threshold percentage.

Referring back to FIG. 3, the group recommendation module 240 computes 306 a score for each candidate group and ranks the candidate groups according to their respective scores. The score for a candidate group represents the likelihood that the target user will join the candidate group if the target user is presented with a recommendation to join the target group. In one embodiment, the score is computed 306 by extracting features from the candidate group and providing those features as input to the group scoring model 250. Examples of features that can be extracted from a group are described above with reference to the group learning module 245. In another embodiment, the score is computed 306 with a method that does not involve machine learning. For example, the group recommendation module 240 may compute 306 the score by providing the features described above with reference to the group learning module 245 (or other data associated with the group and the target user) as input to a score computation process.

In some embodiments, the group recommendation module 240 modifies the ranking of the candidate groups based on one or more diversity rules. A diversity rule prevents candidate groups having a common characteristic from appearing in consecutive positions in the ranking, which allows for a more diverse set of groups to be selected 308 and recommended 310 to the user. A diversity rule may, for example, prevent candidate groups that were identified with the same sourcing rule from appearing in consecutive positions in the ranking. If two consecutive candidate groups in the ranking were identified with the same sourcing rule, then this example diversity rule identifies the next candidate group in the ranking that was not identified with this same sourcing rule and adjusts the ranking of the next candidate group so that it is ranked between the two consecutive candidate groups. A diversity rule may also be configured to allow a maximum number of consecutive groups with a common characteristic. For example, a diversity rule may adjust the ranking to break a chain of three or five consecutive groups with a common characteristic.

The group recommendation module 240 selects 308 one or more candidate groups to be displayed to the user. For example, the group recommendation module 240 selects every candidate group above a threshold position in the ranking. After selecting 308 the candidate groups, the group recommendation module 240 sends 310 recommendations to the target user to join the selected groups.

An example of the effect of the scoring and selection process is shown in FIG. 4. As shown in FIG. 4, the scoring and selection process 408 has the effect of selecting a subset of the candidate groups 406 for display to the user as recommended groups 410. Because the scoring and selection process 408 operates on the candidate groups 406 rather than all of the groups in the group store, the process 408 is applied to a smaller number of groups, which advantageously increases the computational efficiency of this method for recommending groups.

Recommending Groups by Category

Figure 5:
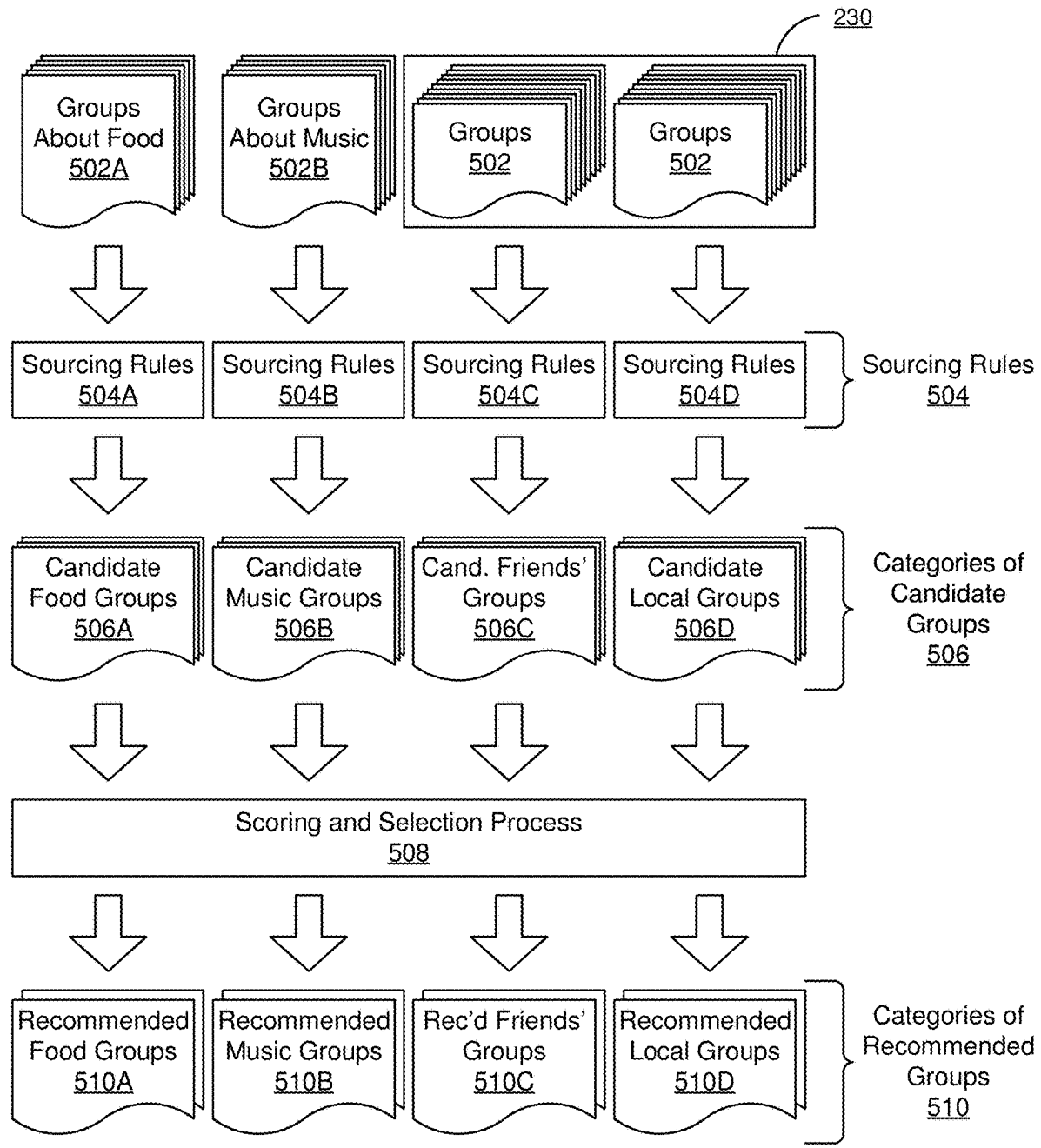
FIG. 5 is a data flow diagram illustrating an example of using multiple sets of sourcing rules to generate multiple categories of recommended groups, according to an embodiment of the invention.

FIG. 5 is a data flow diagram illustrating another example of recommending groups to a user, according to an embodiment of the invention. In the embodiment shown in FIG. 5, the group recommendation module 240 provides multiple sets of sourcing rules 504A through 504D (hereinafter referred to collectively as sourcing rules 504), and each set of sourcing rules 504 corresponds to a category of candidate groups 506A through 506D (hereinafter referred to collectively as candidate groups 506) and to a category of recommended groups 510A through 510D (hereinafter referred to collectively as recommended groups 510).

A category can be associated with a topic or with a characteristic other than a topic. In the example shown in FIG. 5, two of the four categories are associated with the topics. The first category 510A contains recommended groups that are food-related, and the second category 510B contains recommended groups that are music-related. Meanwhile, the other two categories are associated with characteristics other than topics. The third category 510C contains recommended groups that contain members who are connected to the target user, and the fourth category 510D contains recommended groups that are close to the target user.

The sourcing rules 504 corresponding to a category of recommended groups 510 can be tailored to the characteristic associated with the category. For example, the sourcing rules 504C corresponding to the friends' groups category 510C may include a single sourcing rule that meets the description provided above for the first type of sourcing rule. Similarly, the sourcing rules 504D corresponding to the local groups category 510D may include a single sourcing rule that meets the description provided above for the second type of sourcing rule. Meanwhile, the sourcing rules 504A, 504B for the two topic-based categories 510A, 510B may include rules meeting the descriptions provided above for all five types of sourcing rules.

As described above, groups in the groups store may be associated with one or more topics, either by user input from a group administrator or other users or by the topic extraction engine 235. The sourcing rules 504 corresponding to categories for a particular topic are applied to the subset of groups in the group store 230 that are also associated with the topic. For example, the sourcing rules 504A corresponding to the food category 510A are applied to groups 502A associated with the food topic, and the sourcing rules 504B corresponding to the music category 510B are applied to groups 502B associated with the music topic. Meanwhile, the sourcing rules 504 corresponding to categories for a characteristic other than a topic may be applied to all of the groups 502 in the group store 230.

Each set of sourcing rules 504 identifies a plurality of candidate groups 506 for its respective category, and the group recommendation module 240 operates a scoring and selection process 508 (e.g., the scoring and selection steps 306, 308 and process 408 described with reference to FIGS. 3-4) to score the candidate groups 506 in each category and select the recommended groups 510 for each category. As described above with reference to FIGS. 3-4, the group recommendation module 240 may further apply one or more diversity rules when performing the scoring and selection process 508.

In some embodiments, the group recommendation module 240 also determines the order in which the categories are displayed to the target user. In one embodiment, the group recommendation module 240 generates a score for each category, where the score represents a prediction of the target user's interest in the category. For example, the scores may be based on the average score for the recommended groups 510 in the category or the score of the highest-scoring recommended group in the category. If the category is associated with a topic, the scores may also be based on the number of connections between the target user and brand pages or groups associated with the topic. In one embodiment, the category ordering process is configured to always place a particular category or categories at the beginning or end of the ordering, regardless of score (or without generating scores for those categories), and use the scores to determine the ordering of the remaining categories. For example, the category ordering process may place non-topic categories such as friends' groups and local groups at the beginning of the ordering and use the scores to determine the ordering of the topic-based categories.

Figure 6:
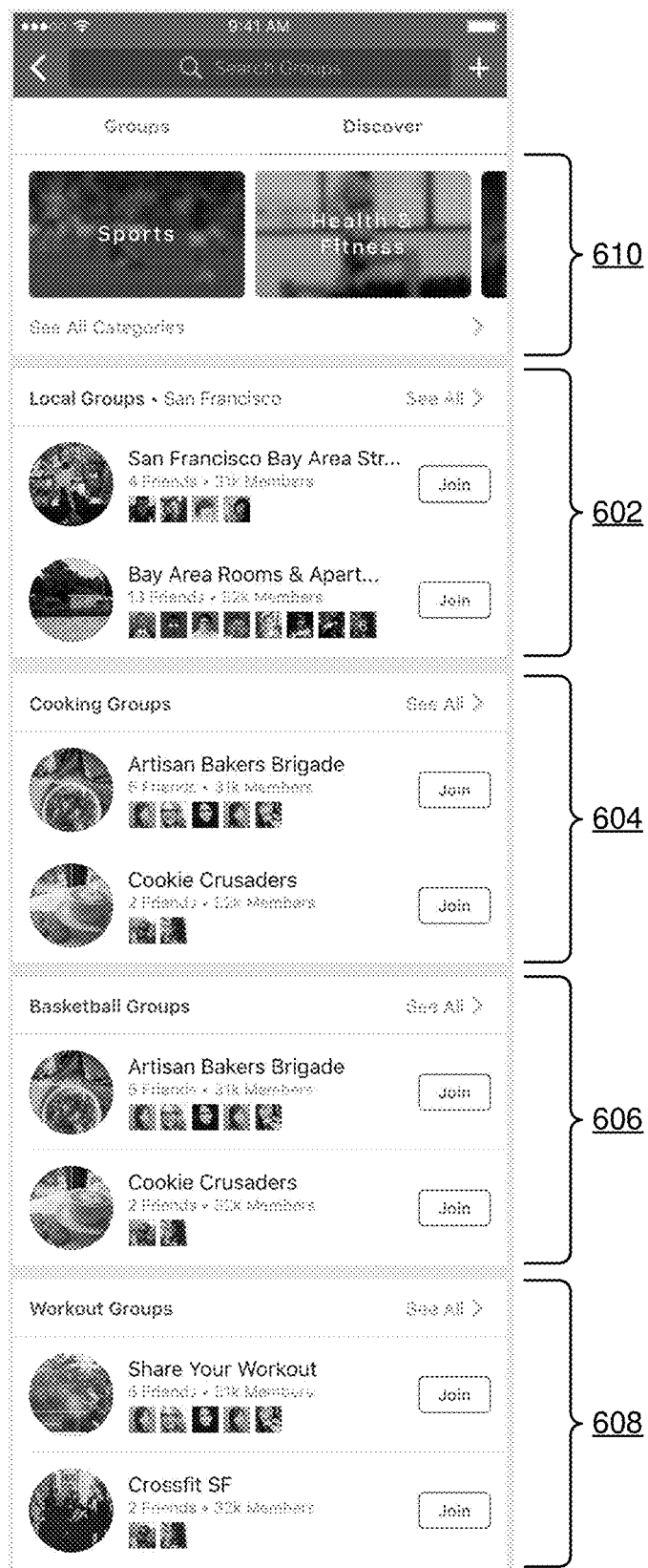
FIG. 6 illustrates an example user interface for displaying categories of recommended groups to a user of an online system, according to an embodiment of the invention.

After selecting the categories of recommended groups 510 and optionally determining an ordering for the categories, the group recommendation module 240 sends the recommended groups and their respective categories to be displayed to the target user. FIG. 6 illustrates an example user interface for displaying categories of recommended groups on a client device 110 to a target user. The example user interface shown in FIG. 6 includes categories for local groups 602, cooking groups 604, basketball groups 606, and workout groups 608. Two groups are displayed for each category, which indicates that the two highest-ranking candidate groups 506 in each category were selected by the scoring and selection process 508. The user interface allows the user to view recommended groups in other categories by scrolling down (e.g., by performing a scrolling gesture) or by selecting a category in the top portion 610 of the user interface.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  maintaining a user account for each of a plurality of users of an online system;
  maintaining a plurality of groups in the online system, each group enabling the users of the online system to interact with other users who are members of the group;
  identifying a target user of the plurality of users to recommend to join one or more selected groups of the plurality of groups;
  selecting a plurality of groups as candidate groups for recommending to the target user, the selection of the plurality of groups based on a plurality of sourcing rules;
  for each of the candidate groups, computing a score for the candidate group representing a likelihood of the target user joining the group if a recommendation to join the group is displayed to the target user by:
    providing a set of features extracted from the candidate group as input to a machine learning model trained based on a training set comprising groups that the target user chose to join after being presented with a recommendation to join the group;
  selecting one or more of the candidate groups for display to the viewing user, the selection of a candidate group based on the score for the candidate group; and
  sending a recommendation to join the selected groups for display to the target user.

2. The method of claim 1, wherein one of the sourcing rules identifies a group as a candidate group if a user connected to the target user is a member of the group.

3. The method of claim 1, wherein one of the sourcing rules identifies a group as a candidate group if the group is associated with a location less than a threshold distance from a location of the target user.

4. The method of claim 1, wherein one of the sourcing rules identifies a group as a candidate group if the group has an activity level exceeding a threshold activity level.

5. The method of claim 1, wherein one of the sourcing rules identifies a group as a candidate group if the group is associated with one or more attributes that match attributes of the target user.

6. The method of claim 1, wherein the selected groups are displayed in a user interface in a plurality of categories, wherein the selected groups displayed in each category were identified as candidate groups by a sourcing rule corresponding to the category.

7. The method of claim 1, wherein each of the plurality of groups in the online system is associated with one or more topics representing the subject matter of the group, and wherein each selected group is displayed in a category matching a topic associated with the selected group.

8. The method of claim 6, further comprising:
  for each of the plurality of categories, computing a score for the category, the score representing a prediction of the target user's interest in the category;
  determining an ordering for the plurality of categories based on the score for each of the plurality of categories,
  wherein the plurality of categories are displayed in the user interface in the determined ordering.

9. The method of claim 8, wherein computing the score for a category comprises determining the target user's interest in the category based on connections between the target user and a plurality of brand pages and groups related to the category.

10. The method of claim 8, wherein the score for a category is computed based on an average score for groups in the category.

11. The method of claim 8, wherein the score for a category is computed based on the score for the group having the highest score of the groups in the category.

12. The method of claim 1, wherein the selection of a candidate group is further based on one or more diversity rules.

13. A non-transitory computer readable storage medium comprising instructions which, when executed by a processor, cause the processor to perform the steps of:
maintaining a user account for each of a plurality of users of an online system;
maintaining a plurality of groups in the online system, each group enabling the users of the online system to interact with other users who are members of the group;
identifying a target user of the plurality of users to recommend to join one or more selected groups of the plurality of groups;
selecting a plurality of groups as candidate groups for recommending to the target user, the selection of the plurality of groups based on a plurality of sourcing rules;
for each of the candidate groups, computing a score for the candidate group representing a likelihood of the target user joining the group if a recommendation to join the group is displayed to the target user by:
providing a set of features extracted from the candidate group as input to a machine learning model trained based on a training set comprising groups that the target user chose to join after being presented with a recommendation to join the group;
selecting one or more of the candidate groups for display to the viewing user, the selection of a candidate group based on the score for the candidate group; and
sending a recommendation to join the selected groups for display to the target user.

14. The non-transitory computer readable storage medium of claim 13, wherein one of the sourcing rules identifies a group as a candidate group if a user connected to the target user is a member of the group.

15. The non-transitory computer readable storage medium of claim 13, wherein one of the sourcing rules identifies a group as a candidate group if the group is associated with a location less than a threshold distance from a location of the target user.

16. The non-transitory computer readable storage medium of claim 13, wherein one of the sourcing rules identifies a group as a candidate group if the group has an activity level exceeding a threshold activity level.

17. The non-transitory computer readable storage medium of claim 13, wherein one of the sourcing rules identifies a group as a candidate group if the group is associated with one or more attributes that match attributes of the target user.

18. The non-transitory computer readable storage medium of claim 13, wherein the selected groups are displayed in a user interface in a plurality of categories, wherein the selected groups displayed in each category were identified as candidate groups by a sourcing rule corresponding to the category.

19. The non-transitory computer readable storage medium of claim 13, wherein each of the plurality of groups in the online system is associated with one or more topics representing the subject matter of the group, and wherein each selected group is displayed in a category matching a topic associated with the selected group.

20. The non-transitory computer readable storage medium of claim 13, wherein the selection of a candidate group is further based on one or more diversity rules.

* * * * *